Patented June 13, 1933

1,913,373

UNITED STATES PATENT OFFICE

ANTHONY G. DE GOLYER, OF BROOKLYN, NEW YORK

MATERIAL FOR MAKING TOOLS

No Drawing.    Application filed June 11, 1928.  Serial No. 284,660.

My present invention relates to a new and useful metallic composition, and relates particularly to a composite body comprising relatively hard crystalline boride and a bonding agent, which composition is suitable for tools for abrading, cutting, forming dies and other articles for the mechanical working of metals and other materials.

The metalloid boron enters into chemical combination with a number of metals, as well as with the metalloids carbon and silicon, to form borides, and such compounds have a high degree of hardness. Attempts have been made heretofore to utilize the hardening effect of boron in various metals, but in all of such attempts it was sought to dissolve the boron in, or otherwise combine it with the other element or elements composing the balance of the article of manufacture. However, when such products contain more than 2% or 3% of boron they are invariably too brittle to be of commercial value, especially in operations for the mechanical working of metals.

I have found that by making a composition containing boride crystals or granules, characterized by a relatively high degree of hardness, disseminated through a matrix, or bonding agent having an appreciably lower degree of hardness than the boride, that the valuable properties of boron may be utilized in full for the mechanical working of metals and other materials.

This invention comprises a manufactured product, or article containing two essential components, namely, a substantially unoxidized chemical compound of boron with one or more metals or metalloids, such chemical compound or boride having a definite crystal structure and being of such degree of hardness as to scratch glass; and a bonding agent interspersed between the crystals or granules of boride, and holding them in a unitary body, the bonding agent being characterized by a lower degree of hardness than the boride, i. e., the bonding material not being of sufficient hardness to scratch glass.

It is the object of this invention to have substantially all of the cutting, abrading, or wear resistant functions performed by the boride crystals or granules, and therefore, it will be understood that the principal function of the soft component of the composition is to act as a binder for holding the hard component in a unitary body of desired form.

I have found through experiment that a number of borides are suitable for use as the essential hard component in the compositions of my present invention such, for example, as borides of aluminum, beryllium, carbon, calcium, chromium, cobalt, manganese, magnesium, molybdenum, silicon, titanium, tungsten, vanadium, uranium and zirconium, and for many purposes a chemical compound containing, in addition to boron, two or more of the above elements may be used as the hard component with satisfactory results.

With the exception of cases in which carbon boride is employed as the hard component, the presence of more than 2 or 3% of carbon is detrimental to the cutting, abrading and other desirable properties of the boron compound. The boron compounds suitable for use in this invention form well defined crystals, characterized by extreme hardness and sharp edges, and I have found that when a metal boride contains more than 3% of carbon combined therewith, the crystal structure is altered in such a manner that the cutting, abrading and other properties are, in general, adversely affected. The presence of carbon also offers difficulties in connection with the manufacture of compositions of this invention, as will appear hereinafter.

In the manufacture of compositions of this invention I have employed several different bonding agents with satisfactory results, such, for illustration, as iron, iron alloys, nickel, copper, copper alloys, such as copper-nickel, copper-cobalt, copper-tin, copper-beryllium, copper vanadium, copper-aluminum and copper-tungsten; cobalt and cobalt alloys; lead and lead alloys; rubber, shellac and other organic compounds, such as those derived from the reaction of formaldehyde and phenol. It will be apparent that selection of the binding agent will depend, in part, upon the use for which the composition is intended. As illustration, when the products of this invention are to be used as abrading tools, as in grinding wheels, the hard component, such as tungsten boride, may be bonded with rubber; or when the products are to be used for a high speed cutting tool, the hard component, such as chromium boride may be bonded with copper, or a copper alloy. I have found that when such tools are operated in such a manner that heat is generated rapidly at the working face of the tool it is desirable to employ a bonding agent which acts as an efficient thermal conductor, and that copper and copper alloys are of value for this purpose.

The compositions of the present invention can be manufactured by several different methods. I have found, in general, that when it is desired to have the size of the boride granules reduced to a minimum and at the same time uniformly distributed through the matrix or bonding agent it is of advantage to effect the reduction of the boride while it is in intimate contact with and disseminated through such bonding agent. As an illustration I give the following example for the production of a cutting tool: A precipitate of chromium borate is prepared and if the precipitate is not of the desired fineness it is further reduced by grinding or other known means. A predetermined quantity of such borate is then thoroughly intermixed with a predetermined amount of iron and nickel oxides and this mechanical intermixture of oxides is then pressed together, for which operation the use of a temporary binder is optional, into the desired shape and the pressed mass is then heated in a furnace and submitted to the action of a reducing gas such as hydrogen for the more or less simultaneous reduction of all of the oxides.

As another example of the method of manufacture, calcium boride may be prepared by the reduction of calcium borate; the calcium boride reduced to the desired degree of fineness and a predetermined amount of this material is then mechanically intermixed with iron oxide and the intermixture is pressed or otherwise formed into the desired shape; the pressed mass is then submitted to reaction with a reducing gas and a temperature sufficiently high to fuse or frit the metallic iron is maintained in the reducing chamber. Following the operations for the production of the compositions the articles may be again heated to an elevated temperature and subjected to forging or other mechanical working for the production of desired forms.

The articles comprised in this invention may be successfully and advantageously employed for a number of purposes; as illustration, a composite body containing as the essential hard component small granules of tungsten boride bonded and held in a desired form by a copper-beryllium alloy, may be used as a high speed drill for metal working; a composite body containing as the essential hard component small granules of molybdenum boride bonded and held in a desired form by a copper cobalt alloy may be used as a high speed cutting tool; a composite body containing as the essential hard component calcium boride bonded and held in a desired form by iron may be used as a metal forming die, such as for wire drawing; a composite body containing as the essential hard component silicon boride bonded and held in a desired form by shellac may be used as a grinding wheel or disc.

The ratio of the essential hard component to the amount of the bonding component is in general, determined by the intended use of the article. When the articles of this invention are used for cutting or abrading the hard component can, for example, constitute approximately 50% by weight of the composite body, although smaller and larger percentages can be employed with satisfactory results to suit the purposes for which intended. For example, drills, cutting or abrading tools containing from 80 to 85% of the hard component can be advantageously employed for many purposes. When the articles are to be used for other purposes, such as for wire drawing dies, etc., I have found that satisfactory and economical results may be obtained with a composite body in which the hard element constitutes approximately 10%.

The boride crystals, or granules should be distributed as uniformly as possible through the matrix, or bonding agent. The fineness of the granules should be reguluated according to the particular object as, for example, for coarse cutting or grinding relatively larger granules may be satisfactorily used than for finer cutting, grinding or polishing. By varying the composition of the borides within the scope of this invention the hardness and degree of brittleness may be varied to meet different requirements.

The borides employed as the essential hard component in the compositions of this invention possess, in many instances, a greater degree of hardness, with reference to the diamond, than any other chemical compounds, and they combine highly advantageous degrees of brittleness with the result that when such borides are used for cutting, abrading, etc., the crystal edges are not worn smooth during operation, but are broken intermittently, thus presenting new sharp edges along the working surface.

A further distinctive advantage is that the borides employed in this invention are not decomposed nor altered at temperatures lower than 1500° C., and are not soluble in many suitable bonding agents, even under conditions where the bonding agent is molten. This is of particular value where tools or other articles are operated under conditions where elevated temperatures are produced, as it is known that iron, nickel and many other metals readily absorb carbon, carbides, silicon and silicides at elevated temperatures, with the result that the entire structure of the tool or other article is altered, and the efficiency materially decreased. These factors are of still further advantage in connection with the manufacture of the articles of this invention when it is necessary or desirable to heat the tool or other article to an elevated temperature for the purpose of forging, or otherwise shaping the article, or for heat treatment to control the grain structure of the bonding agent.

The combined advantageous properties of the boride component, hardness, crystal structure, insolubility in the bonding agent and resistance to decomposition or other chemical alteration at elevated temperatures, together with the means of holding the borides in a unitary form, make it possible to satisfactorily and economically operate tools and other articles included within the present invention under conditions which prohibit the successful operation of heretofore proposed tools and other articles for the mechanical working of metals, in particular, and other materials in general.

It will be understood from the foregoing that the essential hard component of the compositions of my present invention consist principally of crystallized chemical compounds of boron and one or more metals or metalloids, however, such hard component may contain small amounts of elements, not in chemical combination with boron, in the nature of impurities incidental to manufacture.

By the term granules used herein and in the appended claims I intend an aggregate of boride crystals.

By the term boride or metal boride in the claims I intend either a boride of a single metal or metalloid, or a mixture of metal and/or metalloid borides, or a multiple boride of several metals and/or metalloids.

I claim:

1. A metallic composition comprising a mass of hard crystals of metal boride, said metal boride constituting more than 50% of the total weight of the metallic composition, and a binder containing copper and beryllium interspersed therebetween.

2. A metallic composition comprising a mass of hard crystals of metal boride, said metal boride constituting more than 50% of the total weight of the metallic composition, and a binder containing copper, beryllium and cobalt interspersed therebetween.

In testimony, that I claim the invention set forth above I have hereunto set my hand this fifth day of June, 1928.

ANTHONY G. DE GOLYER.